United States Patent [19]

Kronenberg et al.

[11] Patent Number: 4,527,063
[45] Date of Patent: Jul. 2, 1985

[54] SOLID STATE NUCLEAR RADIATION DETECTOR CIRCUIT WITH CONSTANT SENSITIVITY

[75] Inventors: Stanley Kronenberg, Skillman; Robert A. Lux, Toms River, both of N.J.

[73] Assignee: The United States of America as represented by the Secretary of the Army, Washington, D.C.

[21] Appl. No.: 576,992

[22] Filed: Feb. 6, 1984

[51] Int. Cl.³ .............................................. G01T 1/24
[52] U.S. Cl. .................................... 250/370; 250/390
[58] Field of Search .......... 250/370 R, 370 C, 370 E, 250/370 F, 371, 390, 391, 392

[56] References Cited

U.S. PATENT DOCUMENTS 3,872,287  3/1975  Koeman ........................ 250/370 E
4,217,496  8/1980  Daniels et al. .................. 250/390 F
4,217,497  8/1980  Daniels et al. .................. 250/390 F
4,445,036  4/1984  Selph ............................. 250/370 E
4,489,315  12/1984  Falk et al. ...................... 250/370 C Primary Examiner—Janice A. Howell
Attorney, Agent, or Firm—Anthony T. Lane; Michael Zelenka; Jeremiah G. Murray

[57] ABSTRACT

This circuit comprises a solid state crystal radiation counter having its amplified output connected in parallel to a pair of pulse height discriminators with thresholds of $V_1$ and $2V_1$ volts, wherein $V_1$ is above the counter noise level. A pair of pulse counters are arranged to count the outputs of the discriminators and a processor circuit is connected to the pulse counter outputs and is arranged to calculate the quotient of the square of the output of the pulse counter connected to the discriminator with the lower threshold and the output of the other pulse counter. A display circuit is arranged to provide a reading related to the output of the processor circuit.

5 Claims, 3 Drawing Figures

FIG. 1
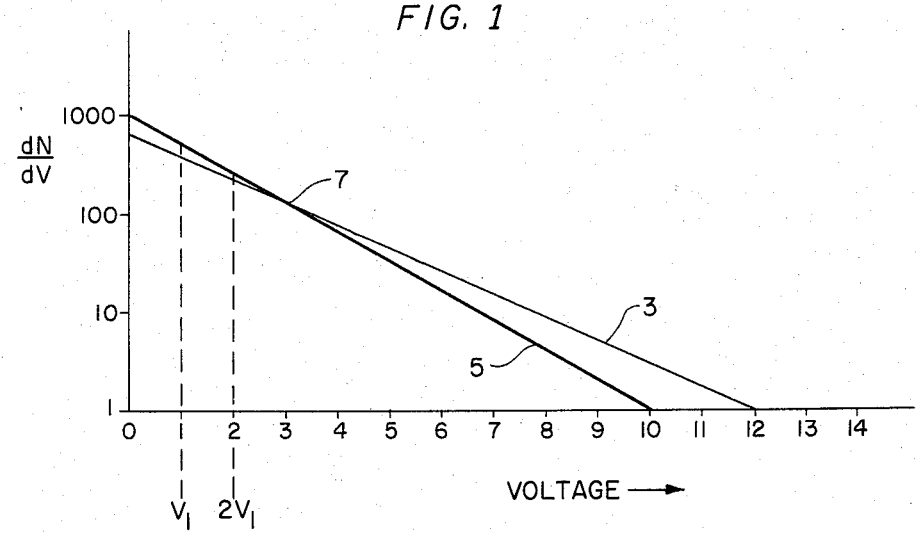
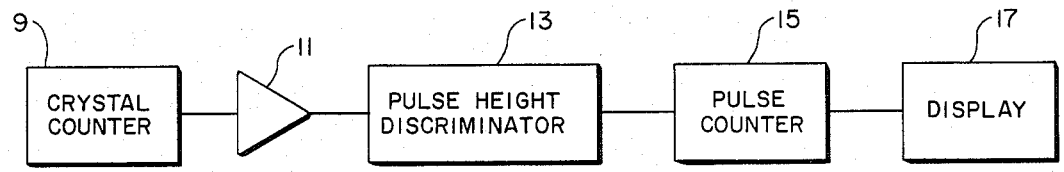
FIG. 2 (Prior Art)
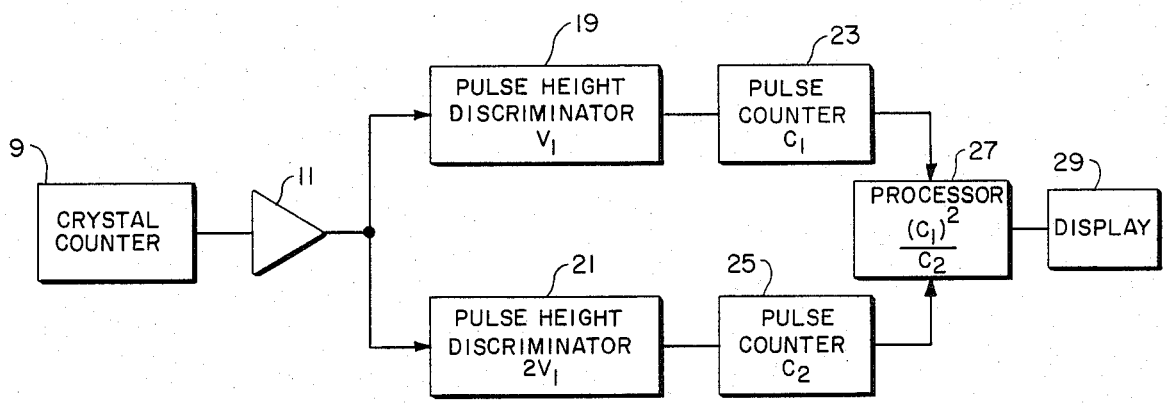
FIG. 3

SOLID STATE NUCLEAR RADIATION DETECTOR CIRCUIT WITH CONSTANT SENSITIVITY

The invention described herein may be manufactured, used, and licensed by or for the Government for Governmental purposes without the payment to me of any royalties thereon.

BACKGROUND OF THE INVENTION

The use of solid state crystal counters for measuring intensities or doses of gamma radiation offers numerous advantages over Geiger-Mueller counters. However the solid state counters present problems if used in an environment with both fast neutrons and gamma rays as in the vicinity of nuclear explosions. This disadvantage has made solid state counter unacceptable for use in Army tactical surveillance equipment and in other applications where performance of radiation detectors must not be impaired by certain doses of fast neutrons. It has been suggested that these solid state counters can be hardened to reduce the effects of these fast neutrons, however this cannot completely eliminate the problem.

The present invention comprises a novel circuit which produces accurate readings of both radiation doses and dose rates regardless of degradation of the performance of solid state crystal counters caused by fast neutron exposure. The circuit adjusts itself automatically to compensate for the varying charge collection efficiency of the crystal detector caused by the fast neutrons, to yield a constant measured count rate for a given dose rate of incident gamma radiation.

SUMMARY OF THE INVENTION

The novel constant sensitivity circuit of the present invention comprises a single solid state crystal counter, the pulse output of which is amplified and applied in parallel to a pair of pulse height discriminators with the threshold voltage of the first discriminator set at a given voltage $V_1$ and that of the second discriminator set at twice the threshold voltage of the first, or at $2V_1$; the outputs of the first and second discriminators are applied to first and second pulse counters, and the counter outputs are applied to a processor circuit which squares the count rate output of the first counter and divides it by the count rate observed by the second pulse counter. The resultant quotient is the constant sensitivity output which is displayed. It can be shown both mathematically and experimentally that due to the exponential nature of the spectrum of the pulse heights from such solid state counters that this novel circuit yields a true count rate regardless of the varying charge collection efficiency of the crystal counter.

BRIEF DESCRIPTION OF THE DRAWINGS

FIG. 1 is a graph of the pulse height spectrum of a crystal counter when irradiated by gamma rays, for two different values of charge collection efficiency.

FIG. 2 is a circuit diagram of a prior art circuit.

FIG. 3 is a circuit diagram of the novel constant sensitivity circuit of the present invention.

DETAILED DESCRIPTION OF A PREFERRED EMBODIMENT

The spectrum of the output of a radiation detector is the distribution of charge pulse heights generated by individual gamma rays in pulse height bins or channels. The experimental finding is that this distribution decreases exponentially with the pulse height. Fast neutron damage to a solid state crystal counter will reduce the charge collection efficiency thereof. This reduced efficiency does not change the total number of pulses produced per dose of incident radiation, but the amplitude distribution of pulses will be changed so that there are fewer high amplitude pulses and more low amplitude ones. The spectrum of the damaged crystal will also be exponential, with the curves representing the damaged and undamaged crystals crossing each other. The theoretical total number of pulses or the integral of the distribution is the same for both the neutron damaged and undamaged crystals.

A crystal counter produces not only the radiation related pulses but also many low amplitude thermal noise pulses which must be excluded from the radiation pulse counting circuits. These noise pulses are excluded by setting the threshold of the pulse height discriminator above the noise pulse level, but this results in also excluding the low amplitude radiation-related pulses. Thus a single channel radiation detector such as that of FIG. 2 will indicate a reduced count rate if the crystal counter becomes damaged by fast neutrons because the damaged crystal will have a greater percentage of its radiation-related pulses below the discriminator threshold and thus the number of high amplitude pulses above the threshold will be correspondingly reduced.

FIG. 1 is the spectra of a solid state crystal for two different values of charge collection efficiency. The curves 3 and 5 are plotted with a logarithmic ordinate, dN/dV, representing counts or pulses per channel (or pulse height bin). The exponential curves 3 and 5 are straight lines when so plotted. The curve 3 represents an undamaged crystal and curve 5 a crystal with lower charge collection efficiency such as would result from fast neutron damage. As can be seen the curves cross over at point 7 so that curve 5 has fewer high amplitude pulses and more low amplitude pulses than curve 3.

In demonstrating the mathematical and physical mode of operation of the invention, it will be assumed that R is the theoretical total number of pulses or count rate for a given dose of incident radiation for all pulse heights from zero to infinity. This quantity R includes only radiation-related pulses and no noise pulses and thus it is the desired quantity which correlates with the dose rate of incident gamma radiation.

dN/dV (V) is the gamma radiation generated pulse height distribution or spectrum (such as that shown in FIG. 1) at the output of the crystal counter, V being the pulse height measured in volts.

K is a quantity equal to or greater than unity which is related to the neutron generated damage and thus to the charge collection efficiency of the counter. In the case of an undamaged crystal, K equals 1.

$V_1$ is a threshold voltage setting of a first pulse height discriminator.

$2V_1$ is the threshold voltage of another or the second pulse height discriminator.

Since it can be shown experimentally that the pulse height sprectrum emerging from a counting grade crystal is an exponential function, the spectrum can be mathematically described as;

$$\frac{dN}{dV} = RKe^{-KV} \tag{1}$$

The total theoretical number of emerging pulses is thus given by the following;

$$\int_0^\infty \frac{dN}{dV} dV = \left[ \frac{RKe^{-KV}}{-K} \right]_0^\infty = R \quad (2)$$

as was defined above.

The total number of pulses above the threshold $V_1$ is as follows;

$$\int_{V_1}^\infty \frac{dN}{dV} dV = \left[ \frac{RKe^{-KV}}{-K} \right]_{V_1}^\infty = Re^{-KV_1} \quad (3)$$

The total number of pulses above the threshold $2V_1$ is as follows;

$$\int_{2V_1}^\infty \frac{dN}{dV} dV = \left[ \frac{RKe^{-KV}}{-K} \right]_{2V_1}^\infty = Re^{-2KV_1} \quad (4)$$

It is apparent that the quantity R can be obtained by squaring the right side of equation (3) and dividing it by the right side of equation (4), thusly;

$$\frac{R^2 e^{-2KV_1}}{Re^{-KV_1}} = R \quad (5)$$

This approach works only for the expontential pulse height distribution which is closely approximated for most counting grade crystals. In cases of actual spectra there may be observable deviations from the exponential spectrum. In these cases the solution to the problems as embodied in the circuit of FIG. 3 still applies because the observed spectrum is always very steep and thus the contribution from the high voltage pulses to the total number of counts can often be neglected.

The prior art solid state crystal counter circuit of FIG. 2 comprises a counter crystal 9 which may for example be cadmium telluride, the pulse output of which is amplified by amplifier 11 and applied to pulse height discriminator 13, which would have its threshold set up so that all of the aforementioned noise pulses are below its threshold voltage. The pulse counter 15 counts the pulses above the threshold of the discriminator and displays a figure related thereto on display circuit 17. This prior art circuit has the disadvantage explained above if the crystal counter is damaged.

FIG. 3 shows the solid state counter circuit of the present invention which embodies the results of the preceding mathematical proof to yield constant sensitivity readings regardless of the charge collection efficiency of the crystal counter. The output of crystal counter 9 is amplified by amplifier 11 and the amplified pulses are applied in parallel to the first pulse height discriminator 19 and the second pulse height discriminator 21. The threshold of discriminator 19 is set at $V_1$ volts which is high enough to exclude all the noise pulses and the threshold of discriminator 21 is set at twice this threshold voltage or at $2V_1$ volts. The outputs of the discriminators are applied to similar pulse counting circuits 23 and 25 which will accummulate counts or voltages $C_1$ and $C_2$ respectively, proportional to the number of pulses applied thereto. The two pulse counter outputs are applied to a processor circuit 27 which arranged to calculate the quotient of the square of the output, $C_1$, of the first pulse counter 23 and the output $C_2$ of the second pulse counter 25, to yield a reading related to R, the total number of radiation-related counts per event of incident gamma radiation, which reading is applied to display circuit 29. The outputs of the pulse counters may be binary coded signals representing the number of pulses counted or an analog signal voltage proportional thereto.

The novel circuit thus comprises a solid state crystal radiation counter the output of which is applied in parallel to a pair of pulse height discriminators with thresholds $V_1$ and $2V_1$, where $V_1$ is above the noise level, with pulse counters connected to the outputs of each of said discriminators and a processor circuit connected to the two pulse counters and arranged to calculate the quotient of the square of the output of the pulse counter connected to the discriminator with the lower threshold and the output of the other pulse counter, and a display circuit arranged to display a reading to said quotient.

While the invention has been described in connection with illustrative embodiments, obvious variations therein will occur to those skilled in the art, accordingly the invention should be limited only by the scope of the appended claims.

I claim:

1. A solid state crystal radiation counter, means to apply the pulse output of said counter to a pair of pulse height discriminators with the threshold voltage of the first of said discriminators set at $V_1$ volts and the second of said discriminators set at a threshold voltage of $2V_1$ volts, and wherein $V_1$ volts is above the noise level of said crystal counter, the output of said first and second discriminators being applied respectively to first and second pulse counters, the output of which are applied to a processor circuit which is arranged to calculate the quotient of the square of the output of said first pulse counter and the output of said second pulse counter to yield a voltage or output which is related to the total number of radiation-related pulses passing through said crystal counter regardless of the charge collection efficiency thereof.

2. A constant sensitivity gamma radiation detection circuit comprising, a solid state crystal counter having its amplified output connected in parallel to a pair of pulse height discriminators with thresholds of $V_1$ and $2V_1$ volts, wherein $V_1$ is above the noise level of said crystal counter, and pulse counters connected to the outputs of each of said discriminators, and a processor connected to the outputs of each of said counters, said processor arranged to calculate the square of the output of the pulse counter connected to the discriminator with the lower threshold and divide said square by the output of the other pulse counter, and a display circuit connected to said processor and arranged to display a reading related to the output of said processor.

3. A constant sensitivity radiation detector circuit comprising a solid state crystal counter, means connected to said counter to obtain a first signal or voltage related to the number of gamma radiation-related pulses in the output of said counter above a given threshold and further means connected to said crystal counter to obtain a second signal or voltage related to the number of gamma radiation-related pulses in the output of said crystal counter above twice the said given threshold, and circuit means arranged to calculate the quotient of the square of the said first signal or voltage and said second signal or voltage to yield a further signal or voltage which is related to the total number of gamma radiation related pulses incident on said crystal counter.

4. A gamma radiation detector circuit with constant sensitivity regardless of the charge collection efficiency thereof, comprising a solid state crystal counter, an amplifier arranged to amplify the pulse output thereof, first and second pulse height discriminators connected to the output of said amplifier, first and second pulse counters connected to the outputs of said first and second discriminators, a processor circuit connected to said pulse counters and arranged to calculate the quotient of the square of the output of said first pulse counter and the output of said second pulse counter, and a display circuit connected to said processor circuit and arranged to display a reading related to said quotient.

5. A gamma radiation detector which utilizes a solid state crystal as a radiation detector, comprising a pair of pulse height discriminators arranged to detect pulses from said crystal above a given threshold voltage and above twice said threshold voltage, wherein said given threshold voltage is above the noise level of said crystal, pulse counters connected to said discriminators, the outputs of said pulse counters connected to a processor circuit arranged to calculate the quotient of the square of the output of the pulse counter connected to said discriminator with said given threshold and the output of the other of said pulse counters, and a display circuit connected to said processor circuit.

* * * * *